J. STASIAK.
AEROPLANE.
APPLICATION FILED DEC. 3, 1913.
1,108,941.
Patented Sept. 1, 1914.
2 SHEETS—SHEET 1.
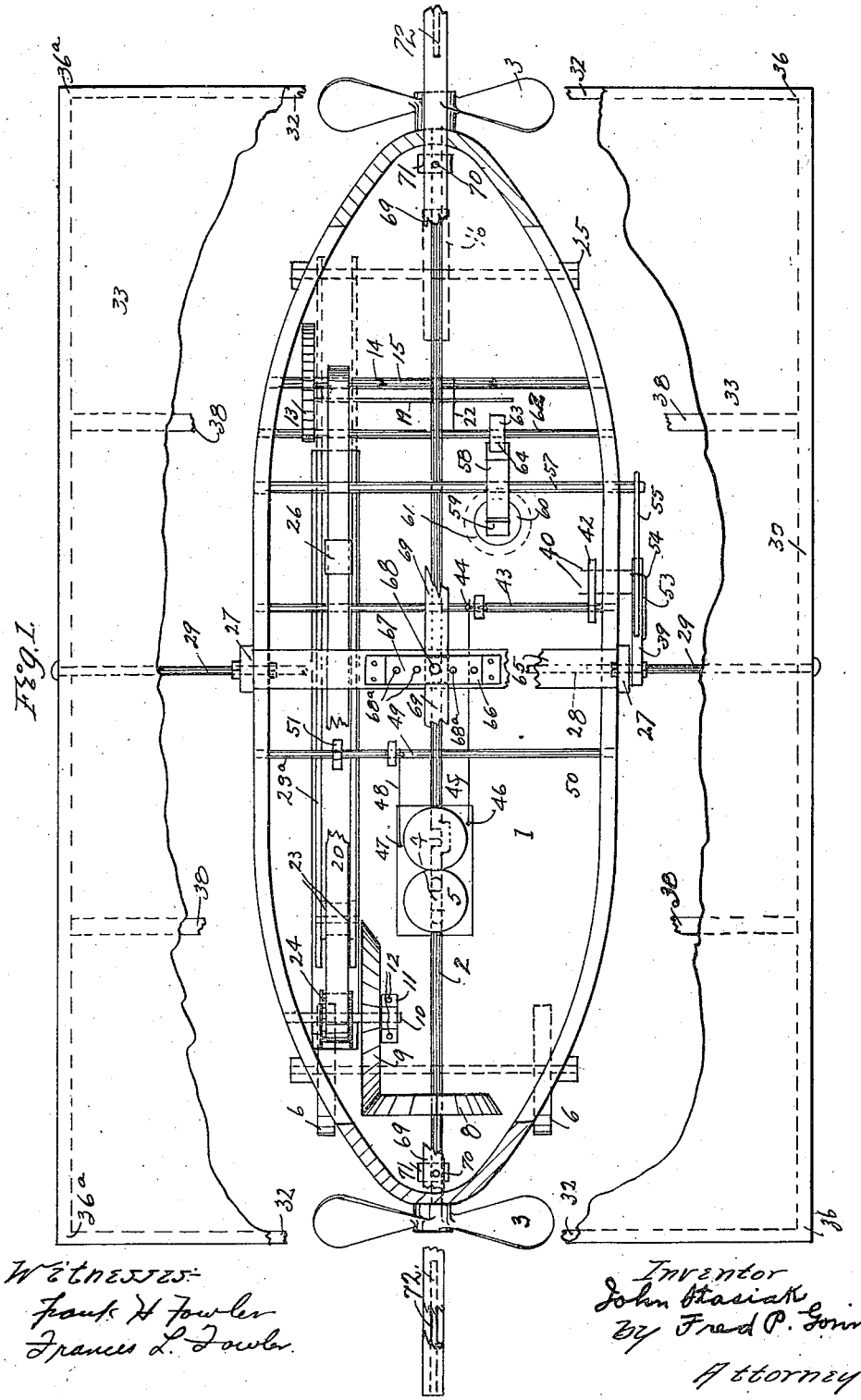
Witnesses:
Frank H Fowler
Frances L. Fowler.
Inventor
John Stasiak
By Fred P. Gonn
Attorney J. STASIAK.
AEROPLANE.
APPLICATION FILED DEC. 3, 1913.
1,108,941.
Patented Sept. 1, 1914.
2 SHEETS—SHEET 2.
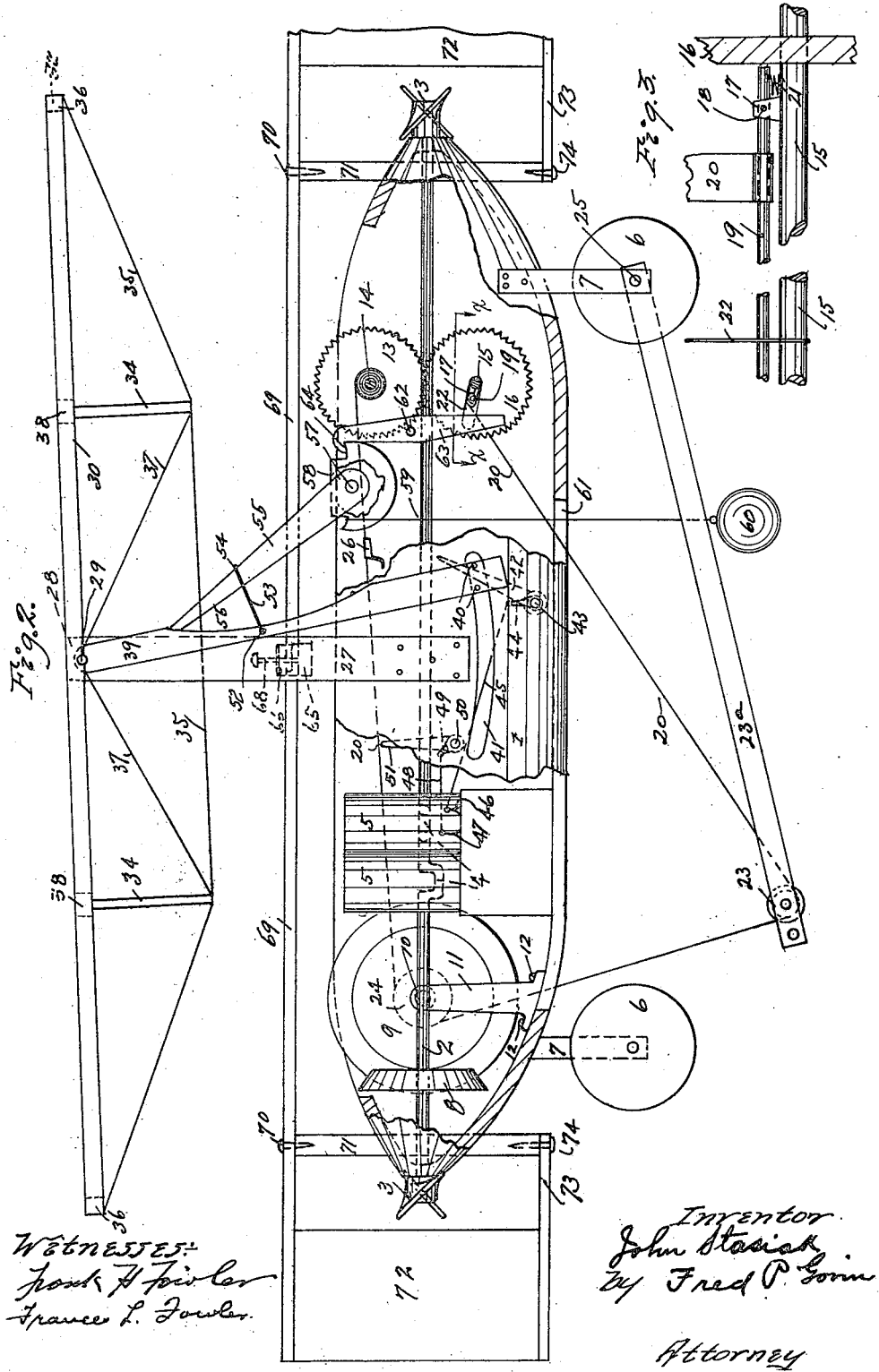
Witnesses:
Frank H Fowler
Frances L. Fowler
Inventor
John Stasiak
By Fred P Gorin
Attorney

UNITED STATES PATENT OFFICE.

JOHN STASIAK, OF SEATTLE, WASHINGTON.

AEROPLANE.

1,108,941.

Specification of Letters Patent. Patented Sept. 1, 1914.

Application filed December 3, 1913. Serial No. 804,340.

*To all whom it may concern:*

Be it known that I, JOHN STASIAK, a citizen of the United States, and a resident of the city of Seattle, county of King, State of Washington, have invented certain new and useful Improvements in Aeroplanes, of which the following is a specification.

This invention relates to aeroplanes, and more especially to destructive aeroplanes designed for use in war, and has for its principal object to provide a device of this character which is automatically controlled in that it includes mechanism which can be set when the device is started on its journey, the setting of which predetermines the length of the journey, and that means is included to automatically reverse the movement of the device and other means is provided which automatically shuts off the power when the device is returned to its starting point. Automatic bomb-dropping means is also provided which is brought into operation the instant the device reaches the limit of its forward travel. This and other objects are accomplished by novel and peculiar arrangements and combinations of the parts, as will be more fully hereinafter described and explained and illustrated in the accompanying drawings, in which—

Figure 1 is a plan view of my device with its plane and other parts broken away. Fig. 2 is a similar view in side elevation. Fig. 3 is an enlarged detail view taken at the line x—x on Fig. 2.

Referring now more particularly to the drawings, reference numeral 1 designates the body of the device, which is pointed at both of its ends, as shown, and extending fore and aft of which is a propeller shaft 2 which revolubly passes through suitable bearings in each end of said body. Affixed to either end of the said shaft is a propeller 3, and formed from the said shaft are the crank arms 4 which may be connected to the pistons of any approved form of engine, indicated at 5. When upon the ground the device is supported upon the wheels 6 whose axles revolve within bearings 7 which are secured to the under side of the device. Affixed to the propeller shaft is a miter gear 8 with which meshes a similar gear 9 affixed to the shaft 10, one end of which revolves within a suitable bearing in one side of the device and its opposite end revolves within the bearing 11 which is secured at 12 to the bottom of the device. At the opposite end of the body 1 is a spur gear wheel 13 which is fixed to the shaft 14 which extends athwart the said body 1 and revolves within suitable bearings in the sides thereof. Beneath the said shaft is a similarly mounted shaft 15 to which is fixed a gear wheel 16 which meshes with the wheel 13. Upon the shaft 15 is a stud 17 through which passes a pintle 18 upon which is pivoted a shaft 19 which is secured to one end of a belt 20. Beneath one end of the shaft 19 is a spring 21 which tends to keep the left-hand end of the said shaft, as viewed in Fig. 3, pressed firmly against the shaft 15. The shaft 19 has, therefore, a movement with respect to the shaft 15 and I provide a loop 22 which is affixed to the shaft 15 and which limits this movement. The belt 20 passes downwardly and around a roller 23, which is mounted upon one end of the frame 23$^a$ thence upwardly and around a similar roller 24 which is secured to the shaft 10, and finally back to the shaft 14 to which it is secured. The frame 23$^a$ is somewhat in the form of a ladder with most of its rungs removed, one of its ends being pivoted upon the axle 25 of one of the wheels 6 and its opposite end is supported by the belt 20. The said frame has sufficient weight to always keep the said belt taut and which, of course, produces friction between the belt and the rollers 23 and 24. Adjustably secured to the belt 20 is a hook 26.

Mounted at each side of the body 1 is an upright 27, extending from one to the other of which is a cross-piece 28. Revolubly mounted within suitable bearings in the upper ends of said uprights is a shaft 29 whose ends also pass through the stringers 30 and are firmly secured to the said stringers. The ends of the said stringers are joined together by means of the cross-pieces 32 which forms the frame of the plane, upon which is stretched the canvas 33. Extending downwardly from the said stringers are pairs of braces 34 to each of which is attached a guy wire 35, each of whose ends is secured to the corners of the frame indicated at 36 and 36$^a$ respectively. Similar wires 37 are also stretched between the lower ends of the said braces and the uprights 27 at each side of the device. Cross pieces 38 may extend at suitable intervals between the stringers 30.

Secured to the shaft 29 is an arm 39 from whose lower end project the fingers 40 which are adapted to wipe back and forth in the slot 41 in the side of the body 1. Between the said fingers projects a lever 42 secured to a shaft 43 which is revolubly mounted in suitable bearings in the sides of the body 1, and secured to the said shaft is a shorter arm 44 to which is secured one end of a connecting rod 45, the other end of same being secured to the lever 46 by means of which the engine is reversed. The lever 47, which cuts off the power from the engine, is similarly secured to a connecting rod 48 which extends to and is connected to an arm 49 which is rigid with a shaft 50, the ends of which are revolubly mounted within suitable bearings in the sides of the device. Projecting upwardly from the shaft 50 is a longer arm 51 with which the hook 26 is adapted to coöperate, as will be presently explained.

Pivoted at 52 upon the arm 39 is a rod 53 which is bent at a right angle as at 54 so as to hook over the lever 55, the free end of which wipes against the arm 39, the lever being cut away in arc shape as indicated at 56 (see Fig. 2) which represents approximately the path of the free end of the arm 55 with respect to the arm 39. The arm 55 is secured to a shaft 57 whose ends revolve within suitable bearings at either side of the body 1, and secured to the same shaft is a semi-circular block 58 which is notched at each of its sides, as shown, and in one of the notches is supported a wire 59 to whose lower end is attached a bomb 60, the said wire passing through an opening 61 in the bottom of the device.

A shaft 62 passes athwart the device and is revoluble within suitable bearings in the sides thereof, and fixed to it is a trigger 63 the upper end of which has the projection 64 which is adapted to engage one of the notches in the block 58, as is plainly shown in Figs. 1 and 2.

Extending from one of the uprights 27 to the other is a cross-piece 65 upon which may be secured a metallic bracket 66, which is slotted as at 67, and through which slot passes a pin 68, which also passes through the inner ends of the two timbers 69 which are pivoted upon the pins 70 which enter the tops of the uprights 71 which pass through and are firmly secured, in any approved manner, to the body 1. The timbers 69, each have secured to their outer ends a rudder 72, the lower edges of said rudders having shorter timbers 73 secured to them and the said shorter timbers are pivoted upon the pins at 74 which enter the uprights 71. The purpose of the pin 68 is that when the timbers 69 are moved about their respective pivots 70 the pins 68 may be thrust through one of the series of openings indicated at 68ª in the cross-piece 65, and thus hold said timbers in their various adjusted positions.

The operation of the device is as follows:
A suitable explosive is suspended from the block 58, the trigger 63 set, the belt 20 wound upon the shaft 15 to an extent which corresponds with the length of the intended forward travel of the device, the plane tilted about as seen in the drawings (in case the device is to move toward the right as seen in Fig. 2.), the rudders 72 turned to allow for contrary air currents, etc., the arms 39 and 55 and their associated parts positioned as seen in Fig. 2, and the hook 26 set along the belt 20 to a point which will cause it to contact with the free end of the lever 51 when the device shall have completed its round trip. Power is now turned on which causes the device to fly in the direction intended, and as the roller 24 revolves the friction between it and the belt 20 causes the latter to unwind from the shaft 15, and since the wheel 13 is in mesh with the wheel 16 the belt winds upon the shaft 14 as fast as it unwinds from the shaft 15. When the belt is entirely unwound from the shaft 15 (see Fig. 2.) the continued pull upon the belt causes one end of the shaft 19 to spring away from the shaft 15 until it contacts with the lower end of the trigger 63 which causes the latter to move about its pivot 62 and to release its projection 64 from the notch in the block 58, which allows the said block to rotate about its pivot and release the wire 51 and bomb 60, which immediately drops and explodes at the desired point. When the block 58 moved about its pivot, as just mentioned, its shaft 57 turned with it, of course, as well as the arm 55, the free end of which arm wiped along the arc 56 and forced the arm 39 about its pivot to the left, as seen in Fig. 2, which movement caused the fingers 40 to carry the free end of the lever 42 in the same direction, which, through the connecting rod 45, caused the engine to be reversed and at the same time tilted the plane in a direction opposite to that seen in Fig. 2, in consequence of which the device immediately began its return travel and continued to fly until the belt 20 unwound sufficiently to bring the hook 26 into contact with the lever 51, which rocks the latter about its pivot and, through the connecting rod 48, causes the power to be shut off which permits the device to descend at the point from which it started.

While I have shown a particular embodiment of my invention, I am aware that many changes therein will suggest themselves to others without departing from the spirit and scope of the invention, and I therefore desire to avoid being limited to the exact form shown and described.

What I claim is—

1. The combination with an aeroplane, of explosive means, and means for attaching same to the aeroplane, means for predetermining the length of flight of the aeroplane, and means for automatically detaching the said explosive when the limit of forward flight has been reached.

2. The combination with an aeroplane, of explosive means and means for attaching same to the aeroplane, means for predetermining the length of flight of the aeroplane, means for automatically detaching the said explosive means when the limit of forward flight has been reached, and means for reversing the course of the aeroplane after said explosive means has been detached.

3. The combination with an aeroplane, of explosive means and means for attaching same to the aeroplane, means for predetermining the length of the forward flight of the aeroplane, means for automatically detaching said explosive means when the limit of forward flight has been reached, and means controlled by the last mentioned means for reversing the travel of the aeroplane.

4. The combination with an aeroplane, of a bomb and means for attaching same to the aeroplane, means for tilting the plane of the aeroplane to reverse its forward flight, means for predetermining the length of the flight, means controlled by the last mentioned means for reversing the flight, means for automatically tilting the said plane when the limit of forward travel has been reached, means for automatically detaching said bomb at about the same instant, and means for automatically stopping the aeroplane after it has returned to its starting point.

5. The combination with an aeroplane, of a bomb and means, including a notched block, for attaching same to the aeroplane, a belt which is caused to be actuated by the propeller shaft of the aeroplane, and by means of which the forward flight is predetermined, a trigger which controls the said notched block, means which is attached to the said belt for actuating the said trigger, an arm which moves with the said notched block, means controlled by said arm to automatically reverse the flight of the aeroplane, a hook adjusted upon said belt and means adapted to be actuated by said hook to cause the power to be shut off from the engine of the aeroplane.

6. The combination with an aeroplane of bomb-supporting mechanism, including a notched block and a coöperating trigger, means for predetermining the length of the forward flight of the aeroplane, including a belt operated by the propeller shaft of the aeroplane, means connected to the said belt for tripping the said trigger when the limit of forward flight has been reached, means which includes a pair of arms, one of which wipes against the other and which are controlled by the tripping of the said trigger, means for reversing the flight of the aeroplane, a hook upon said belt and means controlled by said hook for shutting off the power at a predetermined time.

JOHN STASIAK.

Witnesses:
FRED P. GORIN,
R. D. SMALLEY.